3,177,251
HYDROXY BENZOIC ACID HYDRAZIDES
Maurice Cl. E. Carron, Levallois-Perret, Alexandra F.
Jullien, born Jandot, Paris, Marcel Péron, Gentilly, and
Nicole Y. M.-H. Letteron, born Sudra, Bonneuil-sur-
Marne, France, assignors to Laboratoires Robert et
Carriere, Paris, France, a company of France
No Drawing. Filed July 13, 1961, Ser. No. 123,646
Claims priority, application France, July 30, 1960,
834,697; Apr. 7, 1961 (addition), 858,077
1 Claim. (Cl. 260—559)

This invention relates to hydroxy carboxylic acid hydrazides, more particularly monohydroxy and polyhydroxy benzhydrazides having a substituent on the nitrogen atoms which is not connected directly to the carbonyl group.

It is an object of this invention to provide a class of new compounds capable of inhibiting aminoxidase.

A more particular object is to provide a new compound which is useful for the treatment of psychic depressions and angor pectoris.

Still more particular objects will become apparent as the specification proceeds.

According to this invention, we provide new hydroxy benzhydrazides of the general formula $$(HO)_n\text{-}C_6H_4\text{-}\underset{\underset{O}{\parallel}}{C}\text{-}NH\text{-}NH\text{-}\underset{R'}{\overset{R}{\underset{|}{C}H}} \qquad (I)$$

in which $n$ stands for 1 or 2 while R and R' each represents a hydrogen atom or a methyl, ethyl, phenyl or benzyl group, more particularly compounds of the general Formula I in which the symbols have the following significances:

| $n$ | Hydroxy group position | R | R' |
|---|---|---|---|
| 1 | 2 | —H | —H |
| 1 | 2 | —H | —CH₃ |
| 1 | 2 | —CH₃ | —CH₃ |
| 1 | 2 | —H | —C₆H₅ |
| 1 | 4 | —H | —C₆H₅ |
| 1 | 2 | —CH₃ | —CH₂—C₆H₅ |
| 1 | 2 | —C₂H₅ | —CH₂—C₆H₅ |
| 2 | 2 and 4 | —CH₃ | —CH₃ |
| 2 | 2 and 5 | H | —C₆H₅ |

A particularly desirable compound is (1-methyl-2-phenyl)-ethylhydrazide of 2-hydroxy benzoic acid of the formula $$\text{2-HO-C}_6H_4\text{-}\underset{\underset{O}{\parallel}}{C}\text{-}NH\text{-}NH\text{-}\underset{\underset{CH_3}{|}}{CH}\text{-}CH_2\text{-}C_6H_5$$

For the production of the new compounds corresponding to the above Formula I, known general methods for the production of hydrazides may be resorted to.

More particularly, we provide a process for the production of said new compounds wherein a hydrazone of the general formula $$(HO)_n\text{-}C_6H_4\text{-}\underset{\underset{O}{\parallel}}{C}\text{-}NH\text{-}N=\underset{R'}{\overset{R}{\underset{}{C}}} \qquad (II)$$

in which the symbols are defined as above is reduced catalytically by means of hydrogen under superatmospheric pressure. The starting hydrazone may be produced by reacting a hydrazide of the general formula $$(HO)_n\text{-}C_6H_4\text{-}\underset{\underset{O}{\parallel}}{C}\text{-}NH\text{-}NH_2 \qquad (III)$$

with a carbonyl compound of the general formula $$O=\underset{R'}{\overset{R}{\underset{}{C}}} \qquad (IV)$$

In carrying out our process we may initially suspend the hydrazone and say platinum oxide in an anhydrous organic liquid, suitable proportions in most cases being about 0.20 gram-mol of hydrazone, 0.06 g. of platinum oxide and 250 ml. of an organic liquid such as ethanol, isopentanol or methyl Cellosolve; the reaction is carried out at an elevated temperature with hydrogen under pressure, then the reaction mixture may be filtered to remove the catalyst and unreacted starting material, and finally the organic liquid is removed say distilled off to obtain crude hydrazide. In most cases, a hydrogen pressure of 30–70 generally about 50 kg./sq. cm. and a temperature of the range 120–150° C. are suitable. The yield of the reduction reaction ranges from 25 to 70 percent.

The operation conditions, particularly temperature, reaction period and pressure, may be varied over fairly wide ranges, depending in particular on the catalyst activity and the specific reactants.

In producing hydrazones the starting ketone or aldehyde may be reacted in small excess with the hydroxy benzhydrazide, e.g., in molecular proportion 1.3:1, in an anhydrous organic liquid, for example ethanol; as a rule the desired hydrazone begins to precipitate spontaneously with heat evolution; with a view to completing the reaction, the mixture may be refluxed for the required time, usually about half an hour, then the precipitate may be centrifuged and dried.

In some cases for example when starting from p-hydroxy benzhydrazide, the reaction may be carried out without any diluent.

The yield is substantially quantitative.

We also provide a modification of the above process wherein a hydroxy benzoic acid ester, for example the methyl or ethyl ester, of the formula $$(HO)_n\text{-}C_6H_4\text{-}\underset{\underset{O}{\parallel}}{C}\text{-}O\text{-}R'' \qquad (V)$$

where $n$ has the above significance and R'' represents a methyl or ethyl group is reacted with a hydrazine of the formula

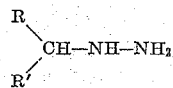 (VI)

where R and R' have the above significances, in an organic liquid such as benzene.

The starting hydrazine may be prepared according to known general methods, particularly those which enable to obtain the same in the form of salts thereof, particularly hydrochlorides; the salt may then be converted to base by reaction with a very concentrated alkali lye, and the base extracted with a solvent such as benzene; in that case the extract thus obtained may be employed directly for reaction with the ester of Formula V.

The yields of the modified process are however lower as a rule than with the first disclosed process.

The following examples are illustrative.

EXAMPLE I

*Methyl hydrazide of 2-hydroxy benzoic acid*

A mixture of methyl salicylate (0.1 gram-mol) and methyl hydrazine (0.15 mol) was heated in benzene (200 ml.) for 21 hours. A product (M.P. 124° C. after recrystallization from benzene) was obtained with a yield of 24%; it was soluble in lower aliphatic alcohols, insoluble in petroleum ether and ligroin, and soluble in warm water, warm benzene and warm acetone.

EXAMPLE II

*Ethyl hydrazide of 2-hydroxy benzoic acid*

Ethyl salicylhydrazone of the formula

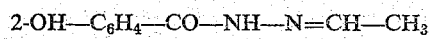

(0.20 gram-mol) and platinum oxide (0.06 g.) were suspended in ethanol (250 ml.), and the hydrazone was reduced with hydrogen (pressure 50 kg./sq. cm.) at a temperature of 130° C. for 6 hours.

The reaction mixture was then filtered, and the filtrate evaporated to dryness under a reduced pressure. Crude hydrazide was obtained with a yield of 25%; after recrystallization from a mixture of benzene and ligroin, the melting point thereof was 87° C. The compound was soluble in acetone, ethyl ether and lower aliphatic alcohols, insoluble in petroleum ether and in ligroin, soluble in warm benzene and in warm water.

EXAMPLE III

*Isopropyl hydrazide of 2-hydroxy benzoic acid*

We worked according to Example II, starting from the hydrazone 2-OH—$C_6H_4$—CO—NH—N=C(CH$_3$)$_2$ and substituting isopentanol for ethanol.

While by reacting a mixture of ethyl salicylate and isopropyl hydrazine for 9 hours the yield amounted to 10%, we obtained in this example, with a yield of 44%, a product which had a melting point of 112° C. after recrystallization from a mixture of benzene and ligroin. The hydrazide was soluble in lower aliphatic alcohols, in acetone and in ether, fairly soluble in benzene, soluble in warm water and insoluble in ligroin.

EXAMPLE IV

*Benzyl hydrazide of 2-hydroxy benzoic acid*

We worked according to Example II, starting from the hydrazone

and substituting methyl Cellosolve for ethanol.

The desired hydrazide was obtained with a yield of 47 percent and had a melting point of 102° C. after recrystallization from a mixture of benzene and ligroin. It was soluble in lower aliphatic alcohols and in acetone, soluble in warm water and warm benzene, insoluble in ligroin.

EXAMPLE V

*Benzyl hydrazide of 4-hydroxy benzoic acid*

Substituting isopentanol for ethanol and starting from the hydrazone p-OH—$C_6H_4$—CO—NH—N=CH—$C_6H_5$, we worked according to Example II and obtained the desired hydrazide (yield 35%; M.P. 177° C. after recrystallization from water). The compound was soluble in lower aliphatic alcohols and in acetone, soluble in warm water and insoluble in ligroin.

EXAMPLE VI

*Isopropyl hydrazide of 2,4-dihydroxy benzoic acid*

We worked in accordance with Example II, from the hydrazone 2,4-(OH)$_2$—$C_6H_3$—CO—NH—N=C(CH$_3$)$_2$ and with isopentanol instead of ethanol. The isopropyl hydrazide obtained with a yield of 68 percent had a melting point of 175° C. after recrystallization from water. It was soluble in lower aliphatic alcohols, in acetone and in warm water, and insoluble in ligroin.

EXAMPLE VII

*Benzyl hydrazide of 2,5-dihydroxy benzoic acid*

We worked according to Example VI, also employing isopentanol and starting from the hydrazone

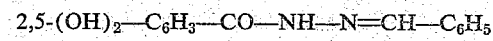

The benzyl hydrazide was obtained with a yield of 33 percent and had a melting point of 166° C., after recrystallization from water. The compound was soluble in lower aliphatic alcohols, in acetone, in warm water and in warm toluene, insoluble in ether, in benzene and in ligroin.

EXAMPLE VIII

*Methyl phenethyl hydrazide of 2-hydroxy benzoic acid*

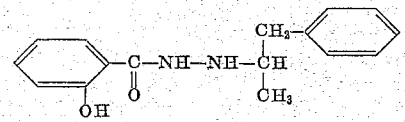

In isopentanol (150 ml.) we dissolved the hydrazone (0.05 gram-mol; M.P. 183° C.) obtained by condensing phenylacetone with 2-hydroxy benzhydrazide of the formula

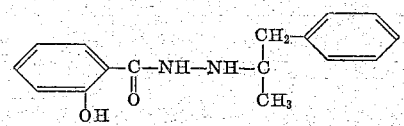

Platinum oxide (0.06 g.) was added, and the hydrazone was reduced under a hydrogen pressure of 60 kg./sq. cm. at a temperature of 130° C. for 8 hours.

The reaction mixture was filtered and the filtrate evaporated to dryness under reduced pressure. The crude hydrazide, a syrupy residue, was crystallized from 50 percent ethyl alcohol, M.P. 80° C.; yield 60 percent.

The compound was soluble in acetone, ether and lower aliphatic alcohols, insoluble in ligroin and petroleum ether, slightly soluble in warm water.

Methyl phenethylidene salicylhydrazide which has not been described so far and was employed as a starting material was produced as follows.

Phenylacetone (0.1 gram-mol; 13.4 g.) was added to a suspension of salicylhydrazide (0.1 gram-mol; 15.2 g.) in ethanol (80 ml.). The hydrazide dissolved, then salicylhydrazone precipitated immediately. The mixture was heated for 10–15 minutes on a water-bath to complete reaction. After cooling the reaction product was filtered. Methyl phenethylidene salicyl hydrazide was obtained with a yield of 80 percent (M.P. 183° C.). It could be recrystallized from either methanol or dioxane.

EXAMPLE IX

*Ethyl phenethyl hydrazide of 2-hydroxy benzoic acid*

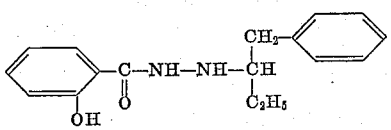

We started from the hydrazone

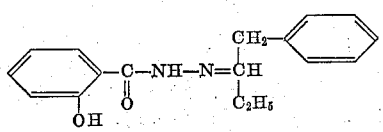

prepared in a similar manner to that set forth in Example VIII by substituting benzyl ethyl ketone for phenyl acetone, and we reduced said hydrazone in isopentanol in the presence of platinum oxide by means of hydrogen (60 kg./sq. cm.), at 140° C. for 8 hours.

After filtering and evaporating isopentanol, crude hydrazide was collected and recrystallized from aqueous ethyl alcohol.

The compounds provided according to this invention were found to inhibit the activity of brain and liver aminoxydase.

The compound of Example VIII, that is to say methyl phenethyl hydrazide of 2-hydroxy benzoic acid or methyl phenethyl hydroxy benzhydrazide (hereinafter MPHBH) was found to show an outstanding activity and other valuable properties as it will now be set forth.

(1) *Anti-aminoxidase activity.*—It is known that 5-hydroxy tryptamine or serotonine subjected in vitro to the action of a pulp of animal organs such as brain, liver or kidney is converted to an aldehyde subsequently oxidized to 5-hydroxy indol acetic acid, by reason of the presence in the pulp of an enzyme, to wit aminoxidase which plays an essential part in the inactivation and hence control of physiological amount of serotonin.

The foregoing reaction is used in tests for the study of substances capable of inhibiting aminoxidase activity.

In our pharmacological research, we employed a technique similar to those disclosed by Sjoerdsma et al., Proc. Soc. Exp. Biol. Med., 89, 36 (1955) and by Bogdanski et al., J. Neurochem., 1, 272 (1957). As animal organs, we employed guinea-pig brain and guinea-pig liver and we compared the anti-aminoxidase activity of MPHBH to that of Iproniazide (1-isonicotyl 2-isopropyl hydrazide). Working with guinea-pig brains, we found that 50 percent of the aminoxidase were inhibited by Iproniazide at a concentration of $0.25.10^{-3.66}$, i.e. $5.5.10^{-5}$ and by MPHBH at a concentration of $0.25.10^{-4.23}$, i.e. $1.5.10^{-5}$. The activity of MPHBH was 5.5:1.5 or about 3.6 times that of Iproniazide. In the case of guinea-pig liver, the activity of MPHBH was found to be about 3.4 times that of Iproniazide.

(2) *Stimulating effects on central nervous system.*—Such effects which are a consequence of the action of MPHBH on brain aminoxidase could be evidenced by the following tests:

(*a*) Superactivity in mouse: A suspension of MPHBH (2000 mg.) in distilled water (100 ml.) was made at a temperature of 40° C. The suspension was administered to mice weighing 20 g. as an average by means of a feed tube, the amount for each mouse being 1 ml. (1000 mg. of active substance per kg.). Most animals soon displayed an extremely noticeable agitation (quivering, jumps or hoppings) and hypermobility in case of noise or attempt to catch the animals. The effect was similar to that observed under the action of amphetamine compounds and aminoxidase inhibiting agents (Iproniazide).

(*b*) Effect on artificial sleep: Mice were given 300 mg./kg. of chloral hydrate intraperitoneally, half an hour after intraperitoneal injection of either 10 mg./kg. or 25 mg./kg. of MPHBH, in carrying out the test described in "Anesthesie et Analgesie" (1960), 17, No. 3, page 304.

The average period of sleep was 41 minutes in control animals and was lowered to 12 minutes and 19 minutes respectively in animals having received 10 mg./kg. and 25 mg./kg. of MPHBH.

(*c*) Anti-reserpine effect: The test employed was that showing alteration of the potentiating effect of reserpine on chloral hydrate hypnotic effect in mice.

Having checked that in 28 mice, a dose of 200 mg./kg. of chloral hydrate did not cause sleep, we administered the same dose to 40 mice then 5 mg./kg. (I.P.) of reserpine, and found that the average sleep period was 48 minutes. We then repeated the experiments with animals which 24 hours before had received 5 mg., 10 mg., 25 mg. and 50 mg./kg. of MPHBH. As low a dose as 5 mg./kg. was found effective (average sleep period 25 minutes with 12 mice) and a dose of 50 mg./kg. completely suppressed the potentiating effect of reserpine.

(3) *Blood pressure effect.*—Injected into dog saphenous vein at a dose of 5 mg./kg. (80 mg. in 2.5 ml. of ethyl alcohol plus 4 ml. of physiological salt solution in a dog weighing 16 kg.) MPHBH caused an increase by about 25 percent of central blood pressure with concomitant bradycardia for about 10 minutes; the peripheral blood pressure recorded at the same time showed a fall by 20–30 percent with return to normal in 3 minutes.

(4) *Acute toxicity.*—The LD 50 (mice; feed tube administration) of MPHBH was about 1.35 g./kg.; in the case of Iproniazide the LD 50 ranges from 0.683 to 0.968 g./kg. according to the administration route.

(5) *Chronic toxicity.*—Administered daily to rats for a month by the disgestive tract, MPHBH did not cause any noxious effect. The dose was as high as 140 mg./kg. or one tenth of the LD 50, i.e., more than 100 times the posology for human beings.

The methyl phenethyl hydrazide of 2-hydroxy benzoic acid (MPHBH) may be employed for the treatment of psychic depressions; so far it was found to be particularly effective in the case of endogenous depressions (affective, idiopathic, organic psychose).

It was also found effective in the treatment of angor pectoris.

Finally the compound was found useful as an ointment component in the local treatment of ischemic lucers, of ulcerations as are sometimes sequels of rheumatismal fever, and of severe burns.

The preferred compositions for general administration consist of MPHBH in association with a tablet excipient, a desirable detailed composition for 100,000 tablets each containing 50 mg. of active substance being as follows:

|  | Kg. |
|---|---|
| Methyl phenethyl hydrazide of 2-hydroxy benzoic acid | 5 |
| Rice starch | 4.500 |
| Talcum | 10 |
| Magnesium stearate | 0.500 |

The ingredients are ground and thoroughly mixed, then tablets made by double compression.

For making an ointment:

|  | Kg. |
|---|---|
| Carbowax excipient (a mixture of polyethylene glycols having an ointment consistency) | 1 | is melted on the water-bath and

|  |  |
|---|---|
| Methyl phenethyl hydrazide of 2-hydroxy benzoic acid | 0.050 | is stirred into the molten excipient. The mixture is then filtered and distributed in tin tubes.

What we claim is:
(1-Methyl-2-phenyl-ethyl) hydrazide of 2-hydroxy benzoic acid of the formula

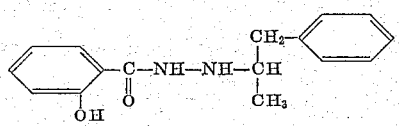

References Cited by the Examiner

UNITED STATES PATENTS

| | | | |
|---|---|---|---|
| 2,808,416 | 10/57 | Bell et al. | 260—559 X |
| 2,862,965 | 12/58 | Lott et al. | 260—559 |
| 2,895,992 | 7/59 | Ohnacker et al. | 260—559 |
| 2,993,835 | 7/61 | Miller et al. | 167—65 |
| 2,995,491 | 8/61 | Schmidt | 167—65 |
| 3,060,192 | 10/62 | Bernstein et al. | 260—559 X |

FOREIGN PATENTS 530,225  9/56  Canada.

OTHER REFERENCES

Baker et al.: "Journ. Chem. Soc. (London)," pages 170–173 (1950).

Cambe et al.: "Journ. Am. Chem. Soc.," vol. 73, page 4021 (1951).

Offe et al.: "Z. Naturforsch," vol. 7–b, pages 446–462, pages 449–451 relied on (1952).

Pletscher et al.: "Progress in Drug Research," edited by Ernst Jucker, vol 2, Interscience Publishers Inc., pages 451–453 (1960).

Yale et al.: "Journ. Am. Chem. Soc.," vol 75, pages 1933–1942, pages 1933, 1940, 1941 relied on (1953).

Zeller et al.: Annals of New York Academy of Science, vol. 80, Art. 3, pages 555–567 (1959).

WALTER A. MODANCE, *Primary Examiner.*

D. T. McCUTCHEN, IRVING MARCUS, *Examiners.*